US012450979B2

(12) United States Patent
Maupas-Oudinot et al.

(10) Patent No.: US 12,450,979 B2
(45) Date of Patent: Oct. 21, 2025

(54) METHOD, DEVICE AND COMPUTER PROGRAM FOR MANAGING WINNINGS OF MULTIPLAYER DIGITAL GAMES OF CHANCE AND GAMBLING

(71) Applicants: LA FRANçAISE DES JEUX, Boulogne-Billancourt (FR); FDJ GAMING SOLUTIONS FRANCE, Boulogne-Billancourt (FR)

(72) Inventors: Jean-Baptiste Maupas-Oudinot, Garches (FR); Cédric Marcadier, Issy les Moulineaux (FR); Lorène Sensenbrenner, Boulogne-Billancourt (FR); Olivier Guyot, Malakoff (FR)

(73) Assignees: LA FRANAISE DES JEUX, Boulogne-Billancourt (FR); FDJ GAMING SOLUTIONS FRANCE, Boulogne-Billancourt (FR)

( * ) Notice: Subject to any disclaimer, the term of this patent is extended or adjusted under 35 U.S.C. 154(b) by 381 days.

(21) Appl. No.: 18/089,409

(22) Filed: Dec. 27, 2022

(65) Prior Publication Data

US 2023/0206722 A1 Jun. 29, 2023

(30) Foreign Application Priority Data

Dec. 28, 2021 (FR) ....................................... 2114566

(51) Int. Cl.
*G07F 17/00* (2006.01)
*G07F 17/32* (2006.01)

(52) U.S. Cl.
CPC ................................ *G07F 17/3244* (2013.01)

(58) Field of Classification Search
None
See application file for complete search history.

(56) References Cited

U.S. PATENT DOCUMENTS 7,503,851 B2 * 3/2009 Walker .................... G07F 17/34 463/25
8,313,372 B2 * 11/2012 Naicker .................. G07F 17/32 463/16
8,845,409 B2 * 9/2014 Kane ....................... G07F 17/32 463/19
9,811,980 B1 * 11/2017 Kowalchuk ......... G07F 17/3293
10,737,180 B1 * 8/2020 Noland ................. A63F 13/847
(Continued)

FOREIGN PATENT DOCUMENTS

WO 2008/049869 5/2008

OTHER PUBLICATIONS

FR Search Report for FR 2114566 mailed Jul. 14, 2022, 2 pages.

*Primary Examiner* — Paul A D'Agostino
(74) *Attorney, Agent, or Firm* — NIXON & VANDERHYE

(57) ABSTRACT

The present disclosure relates to the management of the winnings of multiplayer digital lottery games of gambling and of chance. In a first phase, a player participates in one or more elementary digital games of chance, at least one of which is multiplayer, all the games having a return to player of one hundred percent (full payout). Next, in a second phase, the player participates in a single-player elementary game of chance, which has a return to player less than one hundred percent. This return to player less than one hundred percent represents the return to player of the games of the first phase that the gaming operator could have applied.

20 Claims, 5 Drawing Sheets

(56) References Cited

U.S. PATENT DOCUMENTS

| | | | | |
|---|---|---|---|---|
| 2005/0043080 | A1* | 2/2005 | Strom | G07F 17/32 463/20 |
| 2006/0030393 | A1* | 2/2006 | Seelig | G07F 17/34 463/16 |
| 2006/0287045 | A1* | 12/2006 | Walker | G07F 17/32 463/16 |
| 2009/0247256 | A1* | 10/2009 | Barnes, II | G07F 17/329 463/25 |
| 2010/0093420 | A1* | 4/2010 | Wright | G07F 17/329 463/43 |
| 2010/0227691 | A1* | 9/2010 | Karsten | G07F 17/32 463/42 |
| 2011/0034240 | A1* | 2/2011 | Naicker | G07F 17/3244 463/42 |
| 2011/0059785 | A1* | 3/2011 | Scalisi | A63F 5/0088 463/25 |
| 2011/0070945 | A1* | 3/2011 | Walker | G07F 17/329 463/25 |
| 2011/0275425 | A1* | 11/2011 | Asher | G07F 17/3258 463/6 |
| 2012/0028700 | A1* | 2/2012 | Avent | A63F 13/537 463/43 |
| 2013/0103798 | A1* | 4/2013 | El Chami | H04L 65/1063 709/217 |
| 2013/0331158 | A1* | 12/2013 | Kurtz | A63F 13/30 463/6 |
| 2014/0357269 | A1* | 12/2014 | Zhou | H04W 76/14 455/434 |
| 2014/0357342 | A1* | 12/2014 | Elias | G07F 17/3262 463/20 |
| 2015/0111641 | A1* | 4/2015 | Timm | A63F 13/55 463/31 |
| 2017/0333795 | A1* | 11/2017 | Hardee | A63F 13/35 |
| 2017/0361219 | A1* | 12/2017 | Abecassis | A63F 9/183 |
| 2018/0071624 | A1* | 3/2018 | Fukuda | A63F 13/32 |
| 2018/0075690 | A1* | 3/2018 | Moore | A63F 1/067 |
| 2018/0169528 | A1* | 6/2018 | Hinoshita | A63F 13/795 |
| 2018/0185752 | A1* | 7/2018 | Kakinuma | A63F 13/54 |
| 2018/0207524 | A1* | 7/2018 | Babieno | A63F 13/25 |
| 2018/0260534 | A1* | 9/2018 | Fairbairn | G06F 21/6245 |
| 2019/0385406 | A1* | 12/2019 | Marks | G07F 17/3244 |
| 2020/0038755 | A1* | 2/2020 | Kojima | A63F 13/57 |
| 2021/0065518 | A1* | 3/2021 | Graboyes | G07F 17/3211 |
| 2022/0157125 | A1* | 5/2022 | Yoneda | G07F 17/3213 |
| 2022/0212090 | A1* | 7/2022 | Malnar | G07F 17/3293 |

* cited by examiner

METHOD, DEVICE AND COMPUTER PROGRAM FOR MANAGING WINNINGS OF MULTIPLAYER DIGITAL GAMES OF CHANCE AND GAMBLING

CROSS-REFERENCE TO RELATED APPLICATIONS

This application claims priority to FR 2114566 filed Dec. 28, 2021, the entire contents of each of which are hereby incorporated by reference.

BACKGROUND OF THE INVENTION

Field of the Invention

The invention relates to the field of the management of digital games of gambling and of chance, in particular multiplayer ones.

Description of the Related Art

Multiplayer digital games of gambling and of chance, that is to say with bets and winnings, are games in which several players make a wager on an event, for example a result of instantaneous drawing, by placing a bet. When a gaming operator is remunerated for its management and/or a tax authority taxes the gaming activity, only a portion of the total amount of the bets is paid out to the players. The remainder is deducted to pay the gaming operator and/or the tax authority. The portion paid out to the players is defined by an RTP (return to player) which represents the percentage of the bets to be paid out.

The return to player is generally governed by law and can vary from one jurisdiction to another, or even from one game to another within a same jurisdiction. It may, for example, be 72%. Thus, by way of illustration, if ten players each wager ten euros on a particular event, for example the instantaneous digital drawing of a particular number, the total amount of the bets is one hundred euros. In the absence of deduction, the winner should win one hundred euros if he is the only one to win or fifty euros if there are two winners. However, on account of the deduction by the gaming operator and/or the tax authority, if the RTP is 72%, the single winner wins 72 euros and the deduction is 28 euros. If there are two winners, each winner wins 36 euros and the deduction is still 28 euros.

While the management of the winnings of a multiplayer digital game of gambling and of chance is not too complicated to implement in a single-jurisdiction environment, this complexity may become great when several RTPs are involved in the context of multiplayer multiple-jurisdiction gambling games, that is to say games accepting players passing through different gaming operators dependent on different jurisdictions which may have different RTPs, and possibly different currencies.

There is thus a need for simplification of the management of the winnings of multiplayer digital games of gambling and of chance, in particular in the context of multiple-jurisdiction games.

The present invention is directed in particular to solving these problems.

SUMMARY OF THE INVENTION

To that end, the invention provides a method, a device and a computer program for managing winnings of multiplayer digital games of chance.

A computer method is thus provided for managing winnings of multiplayer digital games of gambling and of chance, the method comprising.

- receiving, from a terminal of a player, by a server of a gaming operator, an indication of participation in a multiplayer digital game of chance, called first indication, said first indication comprising at least one information item relative to an amount of a first bet;
- sending the first indication to a first game engine, the first game engine being configured to implement the multiplayer game, implementing a multiplayer game session and determining, by the first game engine, an amount of winnings for each player of said multiplayer game session, the sum of the amounts of bet of said multiplayer game session being equal to the sum of the determined amounts of winnings;
- obtaining, from the first game engine, by the server, an amount of a first winnings corresponding to the participation of said player in said multiplayer game session;
- receiving, from the terminal of the player, by the server, an indication of participation in a mono-player digital game of chance, called second indication, said second indication comprising at least one information item relative to an amount of a second bet;
- sending the second indication, to a second game engine, the second game engine being configured to implement the mono-player game, implementing a session of the mono-player game and determining, by the second game engine, an amount of a second winnings, the amount of the second winnings being determined with a return to player defined by the gaming operator and being less than one hundred percent; and
- obtaining, from the second game engine, by the server, the amount of the second winnings.

The method according to the invention thus makes it possible to simplify the management of the winnings of multiplayer digital games of gambling and of chance, particularly for example when these games are shared by different jurisdictions.

The method of managing winnings of multiplayer digital lottery games of gambling and of chance comprises a first phase during which a player participates in one or more elementary digital games of chance, of which at least one is multiplayer, all the games having a one hundred percent return to player (these are referred to as games with full payout), and a second phase during which the player participates in a single-user elementary game of chance, which has a return to player less than one hundred percent. This return to player less than one hundred percent represents the return to player of the games of the first phase that the gaming operator would have normally applied.

The method thus makes it possible to avoid the management of the return to player at the multiplayer game level, which is particularly advantageous for multi-jurisdiction multiplayer games, in which the players may come from gaming operators dependent on different jurisdictions and apply different returns to player.

It is to be noted that the method moreover makes it possible to avoid applying a return to player at the multiplayer game level and thus, avoid a possible deceptive effect with the players. As a matter of fact, when a return to player is applied to a multiplayer game, it can be frustrating for a player to find that the total winnings is less than the total of the bets.

According to particular embodiments, the multiplayer game and the single-player game accepting bets in a virtual currency and providing winnings in said virtual currency, the method further comprises a conversion of the amount of the second winnings into a real currency according to a conversion rate defined by the gaming operator.

Still according to particular embodiments, the conversion is a first conversion and the conversion rate is a first conversion rate, the method further comprising a second conversion of an amount in a real currency into an amount in the virtual currency according to a second conversion defined by the gaming operator, the amount in the virtual currency making it possible to carry out the first bet.

The elementary gambling games of the first phase are carried out, preferably, with a virtual currency, obtained for example by conversion of a real currency into a virtual currency, for example into tokens, before the participation in the elementary games of the first phase. Similarly, the single-player elementary gambling game of the second phase is also carried out, preferably, with the virtual currency, a conversion of the winnings expressed in virtual currency into real currency being carried out further to the single-player elementary gambling game. The use of a virtual currency is particularly advantageous for playing multiplayer games in a multi-jurisdiction environment in which different jurisdictions may have different real currencies. The issue of different real currencies is eliminated by the use of a common currency, the virtual currency.

Still according to particular embodiments, the player is a first player, the gaming operator is a first gaming operator, the session of the single-player game is a first session of the single-player game and the return to player defined by the gaming operator is a first return to player defined by the first gaming operator, the method further comprising

- receiving, from a terminal of a second player, an indication of participation in the multiplayer game, called third indication, said third indication comprising at least one information item relative to an amount of a third bet;
- sending the third indication to the first game engine, the first player and the second player both participating in said session of the multiplayer game;
- obtaining, from the first game engine, an amount of a third winnings corresponding to the participation of the second player in said multiplayer game session;
- receiving, from the terminal of the second player, an indication of participation in the single-player game, called fourth indication, the fourth indication comprising at least one information item relative to an amount of a fourth bet;
- sending the fourth indication to the second game engine, implementing a second session of the single-player game and determining, by the second game engine, an amount of a fourth winnings, the amount of the fourth winnings being determined with a second return to player defined by a second gaming operator and being less than one hundred percent;
- obtaining, from the second game engine, the amount of the fourth winnings.

Still according to particular embodiments, the player is a first player, the gaming operator is a first gaming operator, the server is a first server, the session of the single-player game is a first session of the single-player game and the return to player defined by the gaming operator is a first return to player defined by the first gaming operator, the method further comprising

- receiving, from a terminal of a second player, by a second server, the second server being a server of a second gaming operator, an indication of participation in the multiplayer game, called third indication, said third indication comprising at least one information item relative to an amount of a third bet;
- sending the third indication to the first game engine, the first player and the second player both participating in said session of the multiplayer game;
- obtaining, from the first game engine, by the second server, an amount of a third winnings corresponding to the participation of the second player in said multiplayer game session;
- receiving, from the terminal of the second player, by the second server, an indication of participation in the single-player game, called fourth indication, the fourth indication comprising at least one information item relative to an amount of a fourth bet;
- sending the fourth indication to the second game engine, implementing a second session of the single-player game and determining, by the second game engine, an amount of a fourth winnings, the amount of the fourth winnings being determined with a second return to player defined by the second gaming operator and being less than one hundred percent;
- obtaining, from the second game engine, by the second server, the amount of the fourth winnings.

Still according to particular embodiments, the first return to player and the second return to player are different.

Still according to particular embodiments, the method further comprises a conversion of the amount of the fourth winnings into an amount in a currency defined by the second gaming operator according to a conversion rate defined by the second gaming operator.

Still according to particular embodiments, the currency into which is converted the amount of the second winnings is different from the currency into which is converted the amount of the fourth winnings.

Still according to particular embodiments, the method further comprises a conversion of an amount in the real currency into an amount in the virtual currency according to a conversion rate defined by the first gaming operator to perform the third bet.

The games of the first phase are for example grouped together on a digital gaming platform supplied by gaming operators from several jurisdictions, it being possible to share the games by all the gaming operators, so as to enrich their gaming offers. This will therefore be said to be a multi-jurisdiction gaming platform. A player can then have access to games designed by various gaming operators, by using his usual gaming operator, for example the lottery operator of the jurisdiction in which he lives. As regards the single-player game of the second phase, it is specific to the gaming operator through which the player passed to access the games of the first phase, in the sense that the return to player of said game is determined by that gaming operator. The exchange rates associated with the conversions of real currency to virtual currency and vice-versa, are also determined by that gaming operator. Thus, the management of the multi-jurisdiction games of the digital platform, that is to say the games of the first phase, does not involve the taking into account of multiple currencies and/or RTPs.

The invention is also directed to a device configured to implement the method described above. The advantages procured by this device are similar to those described earlier in relation to the method.

A computer program, implementing all or part of the method described above, installed on a preexisting item of equipment, is in itself advantageous, since it makes it possible to access and select, easily and rapidly, an event which may be of interest to a user.

Thus, the present invention also relates to a computer program comprising instructions for implementing the method described above, when that program is executed by a processor.

This program may use any programming language (for example an object language or other language) and be in the form of interpretable source code, a partially compiled code or a fully compiled code.

Another aspect relates to a non-transient medium for storing a computer-executable program, comprising a set of data representing one or more programs, said one or more programs comprising instructions for carrying out all of or part of the method described above on executing said one or more programs by a computer comprising a processing unit coupled operatively to memory means and to an input/output interface module.

BRIEF DESCRIPTION OF THE DRAWINGS

Other features, details and advantages of the invention will appear on reading the following detailed description. This description is purely illustrative and must be read with regard to the accompanying drawings, in which.

DESCRIPTION OF THE PREFERRED EMBODIMENTS

According to particular embodiments of the invention, the method of managing winnings of multiplayer digital lottery games of gambling and of chance comprises a first phase during which a player participates in one or more elementary digital games of chance, of which at least one is multiplayer, all the games having a one hundred percent return to player (the designation game with full payout is used), and a second phase during which the player participates in a single-user elementary game of chance, which has a return to player less than one hundred percent. This return to player less than one hundred percent represents the return to player of the games of the first phase that the gaming operator would have normally applied.

The elementary gambling games of the first phase are carried out, preferably, with a virtual currency, obtained for example by conversion of real currency (real money) into a virtual currency, for example into tokens, before the participation in the elementary games of the first phase. Similarly, the single-player elementary gambling game of the second phase is also carried out, preferably, with the virtual currency, a conversion of the winnings expressed in virtual money into real currency (real money) being carried out further to the single-player elementary gambling game.

The games of the first phase are for example grouped together on a digital gaming platform supplied by gaming operators from several jurisdictions, it being possible to share the games by all the gaming operators, so as to enrich their gaming offers. This will therefore be said to be a multi-jurisdiction gaming platform. A player can then have access to games designed by various gaming operators, by using his usual gaming operator, for example the lottery operator of the jurisdiction in which he lives. As regards the single-player game of the second phase, it is specific to the gaming operator through which the player passed to access the games of the first phase, in the sense that the return to player of said game is determined by that gaming operator. The exchange rates associated with the conversions of real currency to virtual currency and vice-versa, are also determined by that gaming operator. Thus, the management of the multi-jurisdiction games of the digital platform, that is to say the games of the first phase, does not involve the taking into account of multiple currencies and/or RTPs.

Figure 1:
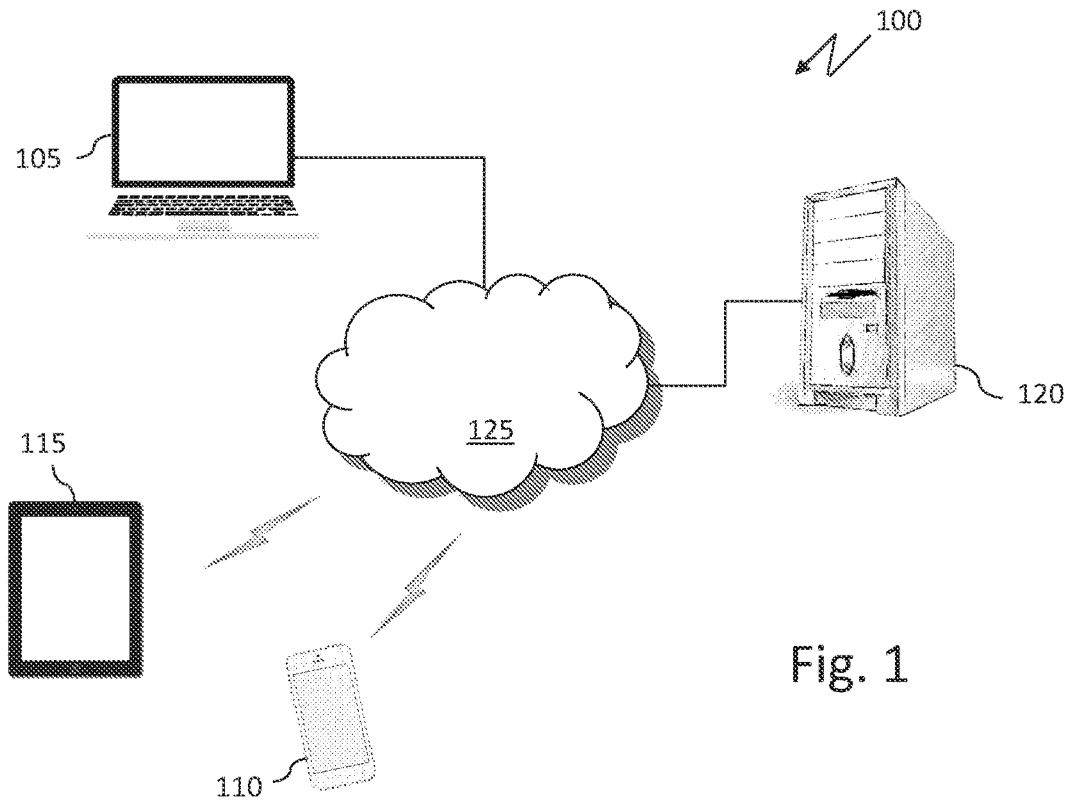
FIG. 1 illustrates an example of an environment in which the invention may be implemented according to particular embodiments.

FIG. 1 illustrates an example of an environment 100 in which the invention may be implemented according to particular embodiments; As shown, a player can participate in digital games of gambling and of chance, in particular multiplayer ones, through a gaming operator, from a terminal 105, for example a point of sale terminal (also called POS, acronym for point of sale), a smartphone 110, a tablet 115 or a personal computer (not shown). This terminal, this smartphone, this tablet and/or this personal computer are connected to one or more servers 120, for example a server of the gaming operator, via a communication network 125. These servers implement different modules such as game managers, game engines, player account managers and player request managers. Examples of such modules are described in more detail with reference to FIGS. 3 to 6.

The terminal 105, the smartphone 110 and the tablet 115 comprise wired or wireless communication means, for example communication means in accordance with the WiFi, Bluetooth or Ethernet standards (WiFi and Bluetooth are trademarks). Similarly, the server 120 comprises communication means. Again this may, for example, be communication means in accordance with the WiFi, Bluetooth or Ethernet standards. The communication means of these devices may be based on standard communication protocols, for example the TCP/IP protocol (the initials standing for Transmission Control Protocol/Internet Protocol).

To participate in the games, the terminal 105, the smartphone 110 and/or the tablet 115 may use specific applications or a web interface, in particular to choose the game or games in which the player wishes to participate, to indicate the amounts of bet, obtain game results and the payment of winnings.

Figure 2:
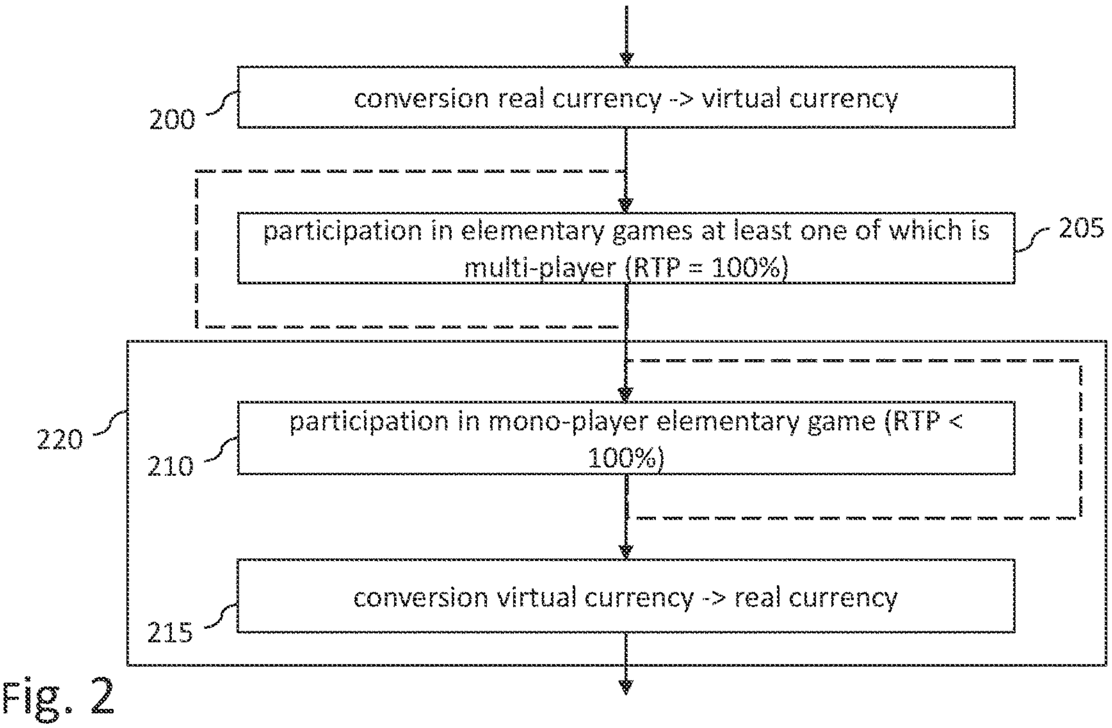
FIG. 2 illustrates an example of steps of a method of managing winnings of a multiplayer game of chance, according to particular embodiments of the invention.

FIG. 2 illustrates an example of steps of a method of managing winnings of digital games of gambling and of chance, according to particular embodiments of the invention;

As illustrated, a first step (step 200) is directed to the conversion of an amount expressed in real currency into an amount expressed in virtual currency, used by a player to participate in games, the player accessing those games via a gaming operator. This step may comprise the debiting of a first player account managed by the gaming operator, for example a player account in euros, and the crediting of a second player account in virtual currency, for example of tokens. By way of illustration, the conversion may be carried out by a simple exchange rate, by application of an exchange rate after removal of lump sum conversion fees deducted by the gaming operator or according to flat rate offers. The second player account, in virtual currency, may be a temporary account, linked to a gaming session, or not be.

A second step is directed to the participation of the player in one or more elementary digital games of chance (as suggested by the arrow in dashed line), of which the return to player here is one hundred percent (step 205). At least one of these games is multiplayer. For these purposes, each player chooses the game or games in which he wishes to participate, indicates the amount and provides an information item relative to the player account to use. The bets here are placed in the virtual currency, coming from the second player account. Similarly, the winnings are attributed in this virtual currency and are credited to the second player account.

After a player has participated in one or more elementary gambling games using his virtual currency, he participates in an elementary single-player gambling game, still using his virtual currency (step 210). The return to player for this game is less than one hundred percent. The player indicates the amount of the bet and provides an information item relative to the player account to use. Similarly, bets and winnings are implemented here in the virtual currency. The single-player elementary gambling game may be determined by the gaming operator or chosen by the player.

In a following step, the amount of the possible winnings is converted into real currency (step 215) to be credited to the player account in corresponding real currency, according to an exchange rate determined by the gaming operator.

The whole of the process from putting into virtual currency in the single-player game to the winnings in real currency, that is to say steps 210 and 215, forms a game called conversion game, referenced 220.

Figure 3:
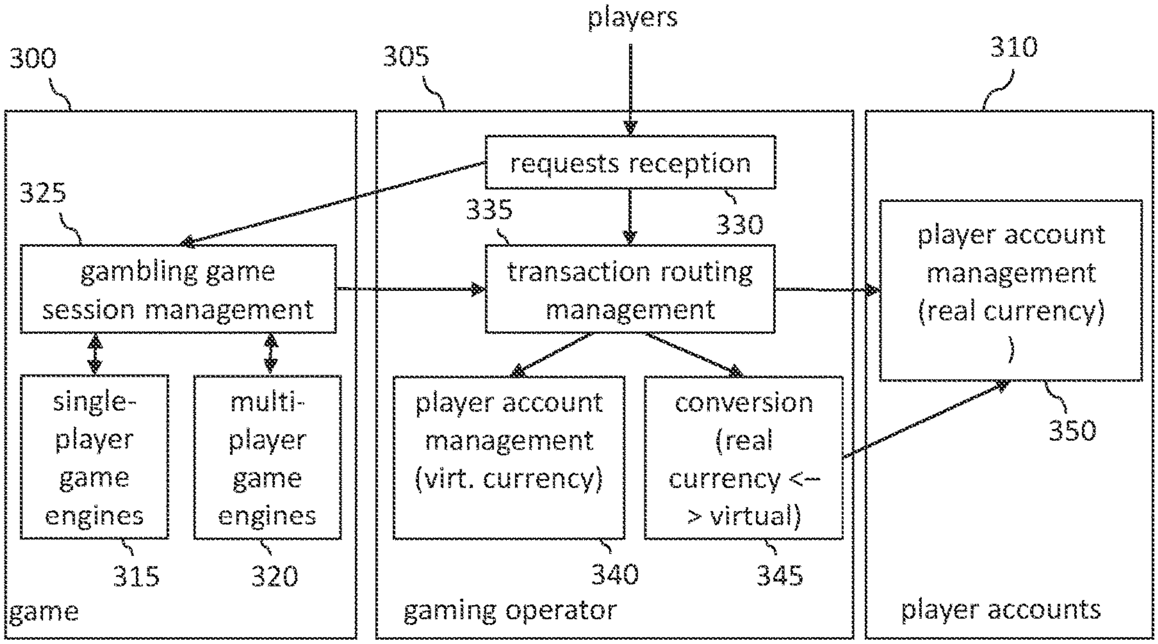
FIG. 3 illustrates a first example of logic architecture of a computer system for implementing the method according to particular embodiments of the invention.

FIG. 3 illustrates a first example of logic architecture of a computer system for implementing a method of managing winnings of multiplayer digital games of gambling and of chance, according to particular embodiments of the invention.

As illustrated, this architecture here is based on three distinct modules, a game module 300, a participations managing module 305 and a storage module for real currency player accounts 310. Naturally, the number of modules is not limited to three, it being possible for there to be more or fewer. The attribution of the functions in the modules may also be different from that illustrated in FIG. 3.

The game module 300 here comprises single-player game engines 315 and multiplayer game engines 320 as well as a sub-module for managing game sessions 325. According to the example illustrated, the module for managing participations 305 comprises a sub-module for receiving requests coming from player devices or devices under their control, referenced 330, a sub-module for managing transaction routing 335, a sub-module for managing virtual currency player accounts 340 and a sub-module for converting amounts expressed in virtual currency into real currency and vice-versa, referenced 345. The real currency player accounts are stored here in the module for storing real currency player accounts, comprising a sub-module for managing real currency player accounts 350.

As illustrated, the requests received from players for participating in gambling games are sent to the sub-module for managing game sessions of the game module as well as to the sub-module for managing transaction routing of the module for managing participations which manages the bets and the winnings, in the virtual and real currencies. The sub-module for managing game sessions manages the games according to the participations and sends the game results to the sub-module for managing transaction routing which manages the transactions relative to the bets and the winnings, in connection with the sub-module for managing the player accounts and with the sub-module of conversion between the virtual and real currencies, as described in more detail with reference to FIGS. 4 to 6.

Figure 4:
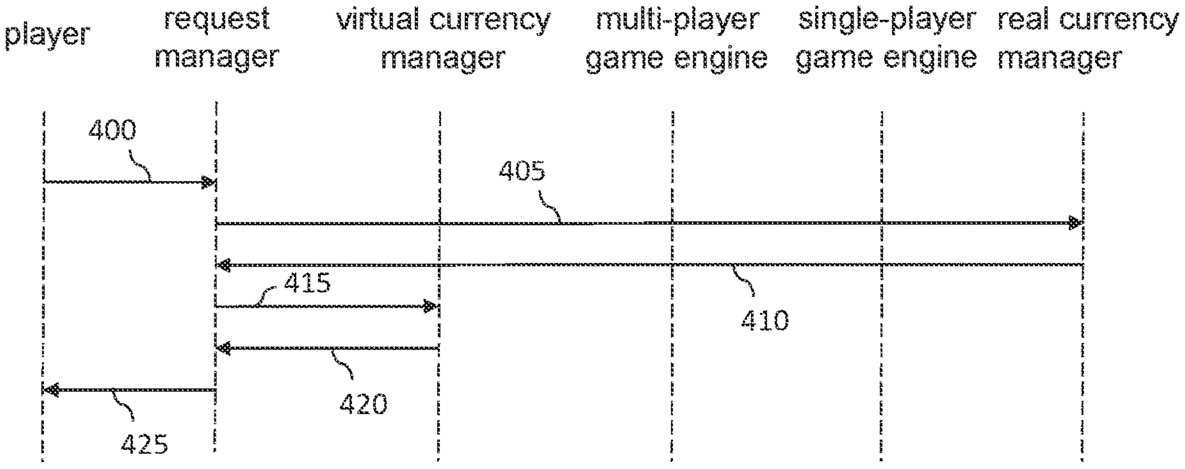
FIG. 4 illustrates an example of a timing diagram of steps of a method of managing a virtual currency account according to particular embodiments of the invention.
Figure 5:
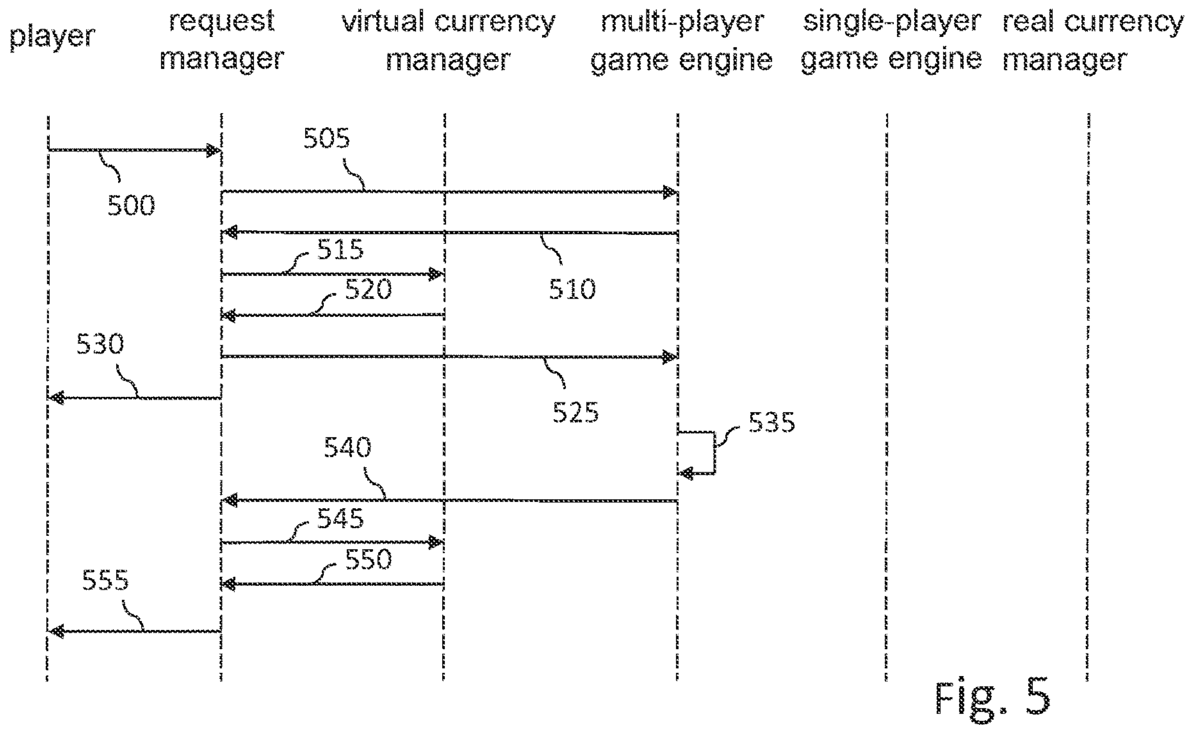
FIG. 5 illustrates an example of a timing diagram of steps of a method of participating in one or more elementary gambling games, of which at least one is multiplayer, according to particular embodiments of the invention.
Figure 6:
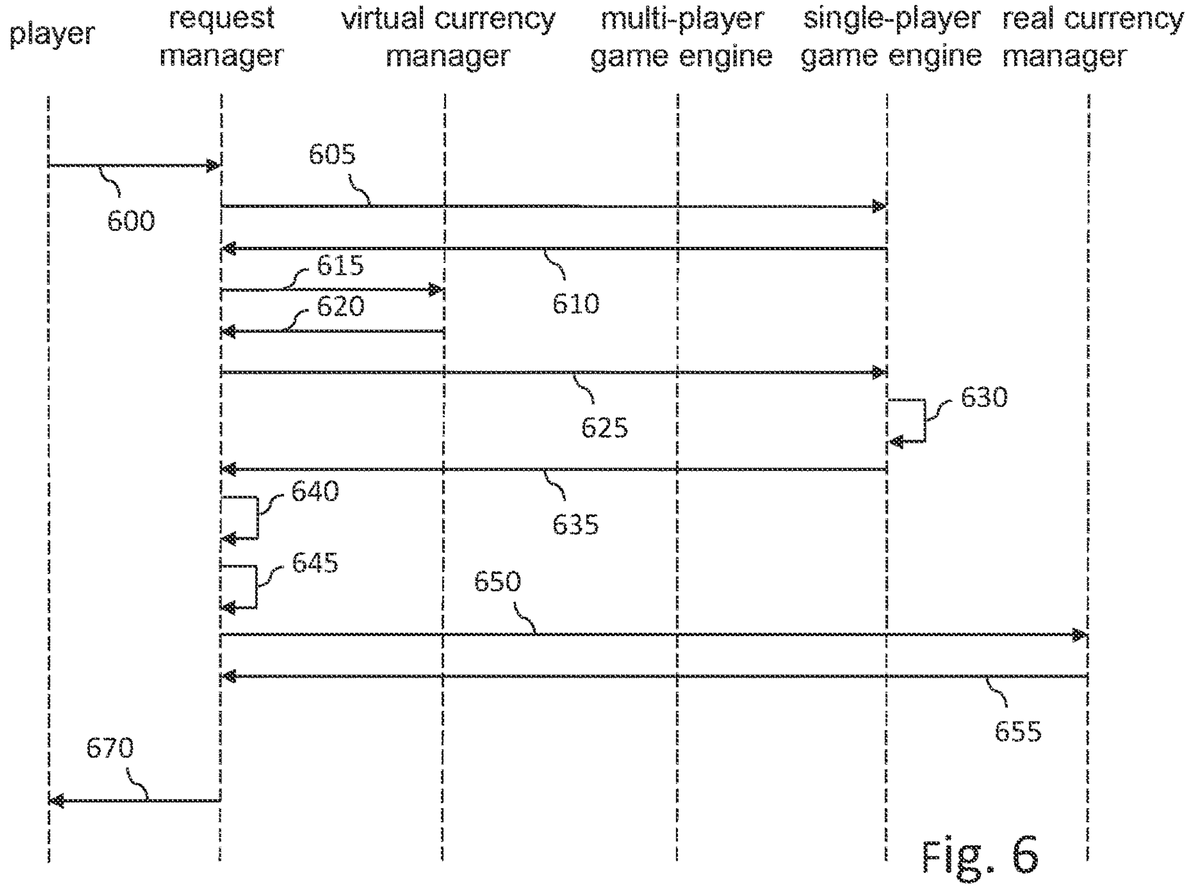
FIG. 6 illustrates an example of a timing diagram of steps of a method of participating in a single-player elementary gambling game, implemented further to the method of FIG. 5, according to particular embodiments of the invention.

FIGS. 4 to 6 illustrate an example of a timing diagram of steps of a method for managing winnings and deductions for multiplayer digital games of gambling and of chance, according to embodiments of the invention. This timing diagram illustrates in particular interactions between a device used by a player to participate in games (or a device used under his control), a request managing module or sub-module (corresponding for example to a combination of the sub-modules 330, 335 and 345 of FIG. 3), a module or sub-module for managing virtual currency player accounts (corresponding for example to the sub-module 340 of FIG. 3), an engine for elementary multiplayer gambling games (corresponding for example to the sub-module 320 of FIG. 3), an engine for elementary single-player gambling games (corresponding for example to the sub-module 315 of FIG. 3) and a module or sub-module for managing real currency player accounts (corresponding for example to the sub-module 350 of FIG. 3).

FIG. 4 illustrates an example of a timing diagram of steps of a method of managing a virtual currency account according to particular embodiments of the invention.

A first step here is directed to a request for the purchase of virtual currency by a player (step 400), through a gaming operator. This request is sent here by the device of a player (or that is under his control) to the request managing module or sub-module. It comprises for example an identifier of the player and an amount to transfer expressed in real currency or in virtual currency as well as, preferably, an identifier of the account in real currency to debit and/or an identifier of the account in virtual currency to credit. This request is preferably encrypted with known means or is sent via a secure communication link. Similarly, all or some of the requests described below are, preferably, encrypted or exchanged over secure links. It is observed here that the identifiers of the accounts to debit and/or to credit may be obtained from an identifier of the player or that a virtual currency account may be temporarily created, for example for the duration of a game session, and associated with the player's identifier.

A following step is for debiting the real currency player account. It comprises in particular sending a debit request by the request managing module or sub-module to the module or sub-module for managing real currency player accounts (step 405). This request comprises for example an identifier of the real currency account to debit and an amount to debit, expressed in real currency. If the module or sub-module for managing real currency player accounts is able to carry out the debit, for example if the player account is sufficiently credited, the debit is carried out and a validation message is sent from the module or sub-module for managing real currency player accounts to the request managing module or sub-module (step 410).

In response to receiving validation of the debit, the request managing module or sub-module sends a request to credit the virtual currency player account (step 415). This request is sent to the module or sub-module for managing virtual currency player accounts and comprises, for example, an identifier of the virtual currency account to credit and an amount to credit, expressed in virtual currency. When the virtual currency player account has been credited, a confirmation message is sent by the module or sub-module for managing virtual currency player accounts to the request managing module or sub-module (step 420) which, in turn, sends a confirmation message to the device used by the player or under his control.

By way of illustration, a module for managing participations enabling the implementation of the steps illustrated in FIG. 4 may give a player the possibility of choosing one or more subscriptions from among several predetermined subscriptions, for example to choose one or more subscriptions from among a set of subscriptions comprising a subscription at €1 comprising 100 tokens and a subscription at €5 comprising 550 tokens. Still by way of illustration, after having chosen two subscriptions at €5, the real currency account of the player is debited €10 and his virtual currency account is credited with 1100 tokens. In all cases, the exchange rate applied to the conversion from real currency to virtual currency is defined by the gaming operator.

FIG. 5 illustrates an example of a timing diagram of steps of a method of participating in one or more elementary games, of which at least one is multiplayer, according to particular embodiments of the invention; These steps correspond to the first phase of the method. These games are accessible to the player via the aforementioned gaming operator. It is however noted that these games may be hosted on a multi-jurisdiction digital game platform supplied by gaming operators from several jurisdictions. Via the aforementioned gaming operator, the player can thus have access to games offered by other game operators, which gaming operators may possibly operate in different currencies or use different returns to player from the aforementioned gaming operator.

The elementary games here only use the virtual currency. The bets are thus made with the virtual currency. Similarly, the possible winnings are paid in virtual currency. The return to player here is one hundred percent, and the payout is thus total. In a multi-jurisdiction environment, the issues arising from different currencies and/or different RTPs are thus not managed at the time of this first phase.

A first step here is directed to a request for participation in an elementary digital game of chance (step 500). This request is sent here by the device of a player (or that is under his control) to the request managing module or sub-module. It comprises for example an identifier of the player, an identifier of the elementary game of chance in which the player wishes to participate as well as a bet expressed in virtual currency.

In a following step, a request is sent to a game engine of the game in which the player wishes to participate (step 505). A multiplayer game engine is represented here, but it could be a single-player game engine. This request is sent to the game engine concerned by the request managing module or sub-module. It comprises for example an identifier of the player, an identifier of the game and an amount of bet expressed in virtual currency. If the game engine accepts the participation request, it sends back a debit request corresponding to the bet (step 510). It is sent to the request managing module or sub-module here.

Further to the reception of a debit request, the request managing module or sub-module sends an equivalent debit request to the module or sub-module for managing player virtual currency accounts (step 515). If the latter validates the request, for example if the virtual currency player account is sufficiently credited, the debit is made and a confirmation message is sent to the request managing module or sub-module (step 520). A corresponding confirmation message is next sent to the game engine (step 525) which validates the participation of the player as well as to the device of the latter or device controlled by the latter (step 530).

Further to an elementary gambling game session, the winner or winners are identified (step 535), for example using their identifiers sent in the participation requests.

In a following step, a credit request may possibly be sent by the game engine to the request managing module or sub-module (step 540). A single request may concern all the winning players. Such a credit request comprises for example an identifier of one or more players and, for each player identifier, an amount to credit, expressed in virtual currency. Further to the reception of a credit request, the request managing module or sub-module sends one or more equivalent requests to the module or sub-module for managing player virtual currency accounts (step 545). Such equivalent requests comprise for example an identifier of one or more player accounts and, for each player account identifier, an amount to credit, expressed in virtual currency. After the player account or accounts have been credited, the virtual currency player account managing module or sub-module sends one or more credit confirmation messages to the request managing module or sub-module (step 550) which then informs the winning player or players, via their devices or another, that they have won, and, preferably, indicates to them the sum that has been won, expressed in virtual currency (step 555).

Steps 500 to 530 or 500 to 555 are repeated as many times as the player wishes to participate in games during the first phase of the method, it being understood that at least one of these games is a multiplayer game.

FIG. 6 illustrates an example of a timing diagram of steps of a method of participating in a non full payout single-player elementary gambling game, according to particular embodiments of the invention. These steps correspond to the second phase of the method, implemented further the first phase. The criteria of this game, in particular the return to player, are defined by the gaming operator which the player used to access the games of the first phase.

A first step here is directed to a request for participation in a single-player elementary gambling game (step 600). This request is sent here by the device of a player (or that is under his control) to the request managing module or sub-module. It comprises for example an identifier of the player, an identifier of the single-player game, as well as a bet expressed in virtual currency.

In a following step, a request is sent to the game engine corresponding to the single-player game (step 605). This request is sent to the game engine concerned by the request managing module or sub-module. It comprises for example, an identifier of the game and an amount of bet expressed in virtual currency, and also, preferably, an identifier of the player. If the game module accepts the participation request, it sends back a debit request corresponding to the bet (step 610). It is sent to the request managing module or sub-module here.

Further to the reception of a debit request, the request managing module or sub-module sends an equivalent debit request to the module or sub-module for managing player virtual currency accounts (step 615). If the latter validates the request, for example if the virtual currency player account is sufficiently credited, the debit is made and a confirmation message is sent to the request managing module or sub-module (step 620). This confirmation message is sent to the game engine which then validates the participation of the player (step 625).

When the elementary single-player game has finished, it is determined whether the player is a winner and, if so, the amount of the winnings is determined (step 630). The return to player, linked to the gaming operator, is less than one hundred percent here to enable deduction, for example the remuneration of the gaming operator and/or the taxes of the tax authority to whom the gaming operator is beholden.

In a following step, a credit request may be sent by the single-player game engine to the request managing module or sub-module (step 635), according to the result of the game. A credit request comprises an amount to credit, expressed in virtual currency, and, preferably, an identifier of the player.

The amount of the winnings expressed in virtual currency is next converted into an amount in real currency (step 645). The request managing module or sub-module then sends a credit request to the real currency player account managing module or sub-module (step 650). This request comprises for example an identifier of a player account to credit and the amount to credit, expressed in real currency, corresponding to the result of the single-player game. After the player account has been credited, the real currency player account managing module or sub-module then sends a credit confirmation message to the request managing module or sub-module (step 655) and informs the player, via his device or another, that he has won and indicates the amount of the sum won, expressed in real currency (step 670).

Of course, there are numerous variants.

As described above, the return to player less than one hundred percent, associated with the single-player elementary gambling game, represents the return to player associated with the gambling games of the first phase, determined by the gaming operator.

Figure 7:
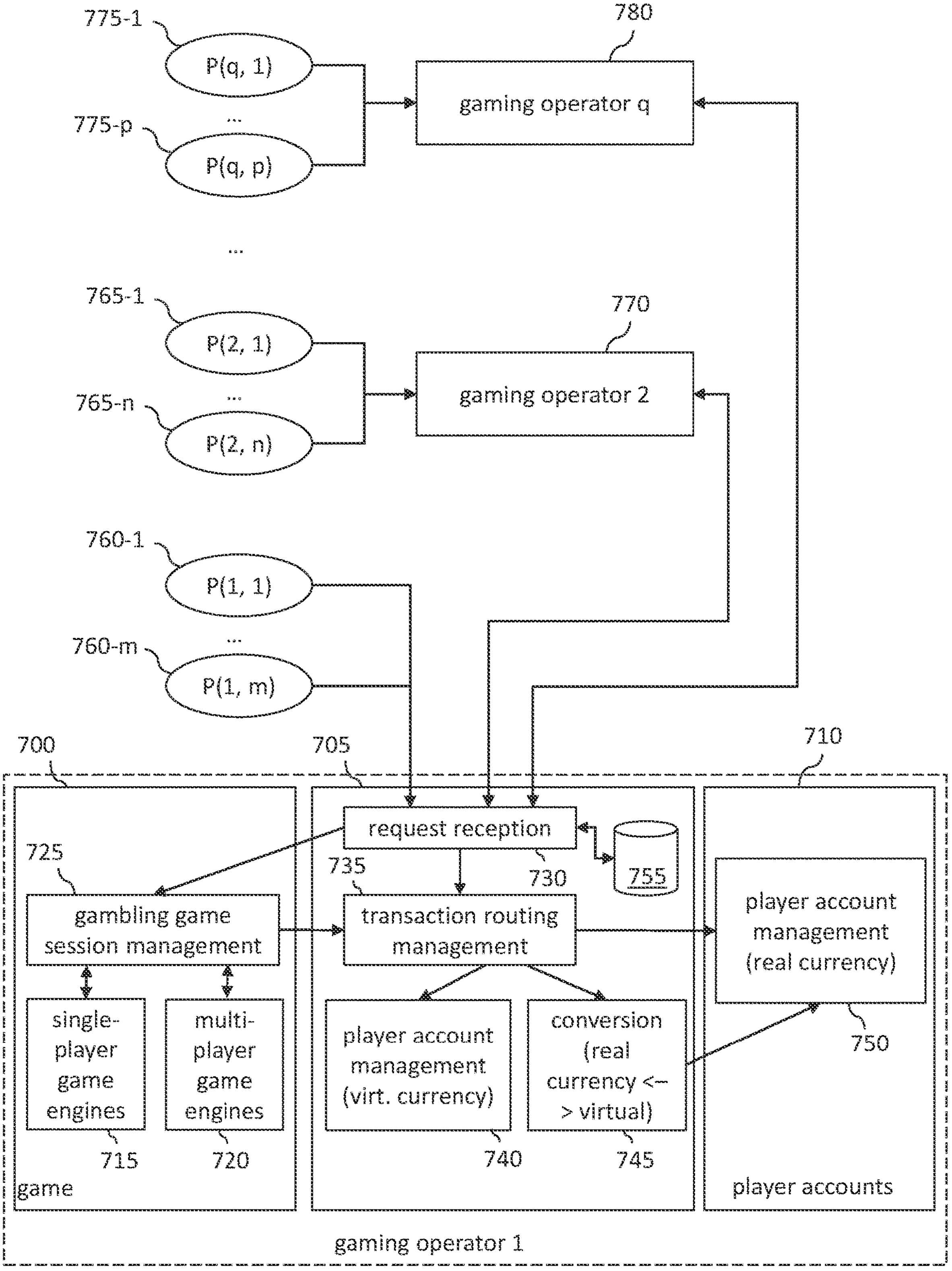
FIG. 7 illustrates a second example of logic architecture of a computer system for implementing the method according to particular embodiments of the invention.

FIG. 7 illustrates a second example of logic architecture of a computer system for implementing a method of managing winnings of multiplayer digital games of gambling and of chance, according to particular embodiments of the invention.

As illustrated, players here can access the multiplayer digital games of gambling and of chance via different gaming operators, for example gaming operators associated with different jurisdictions.

According to this example, the multiplayer and multi-jurisdiction games are hosted on a digital platform that is shared in relation to different gaming operators controlled by different jurisdictions which each have their own RTP and, possibly, different currencies. By way of illustration, the digital platform here is implemented by a gaming operator who uses its own game engines. Thus, two multiplayer games of this platform have participants who have access directly thereto or via different gaming operators.

Since the players of the multi-jurisdiction game are potentially subject to different RTPs and do not necessarily all play in the same currency, a virtual currency, common to all the game operators is used in combination with one or more full payout games. The issues of different currency and RTP are thus managed at the level of each game operator, directly or by delegation, before and after the phase of the multi-jurisdiction games, in particular by currency conversions to a virtual currency and from an amount of virtual currency to real currency and by the implementation of single-player games having RTPs less than one hundred percent. The single-player game or games used may be implemented centrally in the shared platform or by each gaming operator.

The architecture illustrated in FIG. 7 here adopts the three distinct modules illustrated in FIG. 3, a game module 700, a participation managing module 705 and a real currency player account storage module 710. Again, the number of modules is not limited to three, it being possible for there to be more or fewer, and the distribution of the functions in the modules may be different. As illustrated, these modules are implemented here by a first gaming operator (the gaming operator 1).

Like the game module 300 of FIG. 3, the module 700 here comprises one or more single-player game engines 715 and one or more multiplayer game engines 720 as well as a game session managing sub-module 725. Again, according to the example illustrated, the module for managing participations 705 comprises a sub-module for receiving requests coming from player devices, from devices under their control or from gaming operator servers, referenced 730, a sub-module for managing transaction routing 735, a sub-module for managing virtual currency player accounts 740 and a sub-module for converting amounts expressed in virtual currency into real currency and vice-versa, referenced 745. The real currency player accounts are stored here in the module for storing real currency player accounts, comprising a sub-module for managing real currency player accounts 750. The role of these modules is similar to that described with reference to FIG. 3.

The module for managing participations 705 further comprises information relative to the RTP of each gaming operator and, as may be appropriate, to the conversion rate to use for converting amounts expressed in virtual currency to real currency and vice-versa and to the currencies used. These data are stored here in a database 755, for example in the form of a table. Table 1 hereto illustrates an example of such a table. Thus, for example, the gaming operator having the identifier 4689216 implements an RTP equal to 85, which is for example imposed by its jurisdiction, and uses a conversion rate of 30 to convert an amount expressed in dollars into virtual currency and a conversion rate of 1/30 to convert an amount expressed in virtual currency into dollars. As illustrated, the conversion rate used for converting an amount expressed in real currency into virtual currency is not necessarily the inverse of that used to convert an amount expressed in virtual currency into real currency. The conversion rate used to convert an amount expressed in real currency into virtual currency is for example defined by the gaming operator managing the shared platform while the conversion rate used to convert an amount expressed in virtual currency into real currency is for example defined by the gaming operator in relation with the player considered. As illustrated, the players P(1,1) to P(1,m), referenced 760-1 to **760-*m* here play directly in relation with the gaming operator managing the shared platform. They thus address their request directly to a server of the latter, here to the participation managing module 705. The players P(2,1) to P(2,n), referenced 765-1 to 765**-*n*, here are players who are able to play in relation with another gaming operator, the gaming operator 2.

The requests from players 765-1 to 765-*n* are thus sent to a server 770 of the gaming operator 2 which sends them, with a gaming operator identifier, to the participation managing module 705 of the gaming operator managing the shared platform. Knowing an identifier of the gaming operator in relation with which the players play, the participation managing module 705 can determine the appropriate RTPs and/or rates. In the same way, the players P(q,1) to P(q,p), referenced 775-1 to 775-*p*, here are players who are able to play in relation with the gaming operator q. The requests from players 775-1 to 775-*q* are thus sent to a server 780 of the gaming operator q which sends them, with a gaming operator identifier, to the participation managing module 705 of the gaming operator managing the shared platform.

Thus, after having participated in a multiplayer game, a player plays a single-player game using an RTP specific to the gaming operator in relation with which the player plays, the amount of the possible winnings then being converted, if necessary, into real currency (real money) according to a conversion rate specific to that gaming operator.

There are of course numerous variants. In particular, the accounts of the players may be managed directly by each gaming operator, each gaming operator taking on the task of the management of the player accounts and of the conversions of amounts in real currency into amounts in virtual currency and vice-versa. Similarly, the single-player game may be chosen and implemented by each gaming operator.

Figure 8:
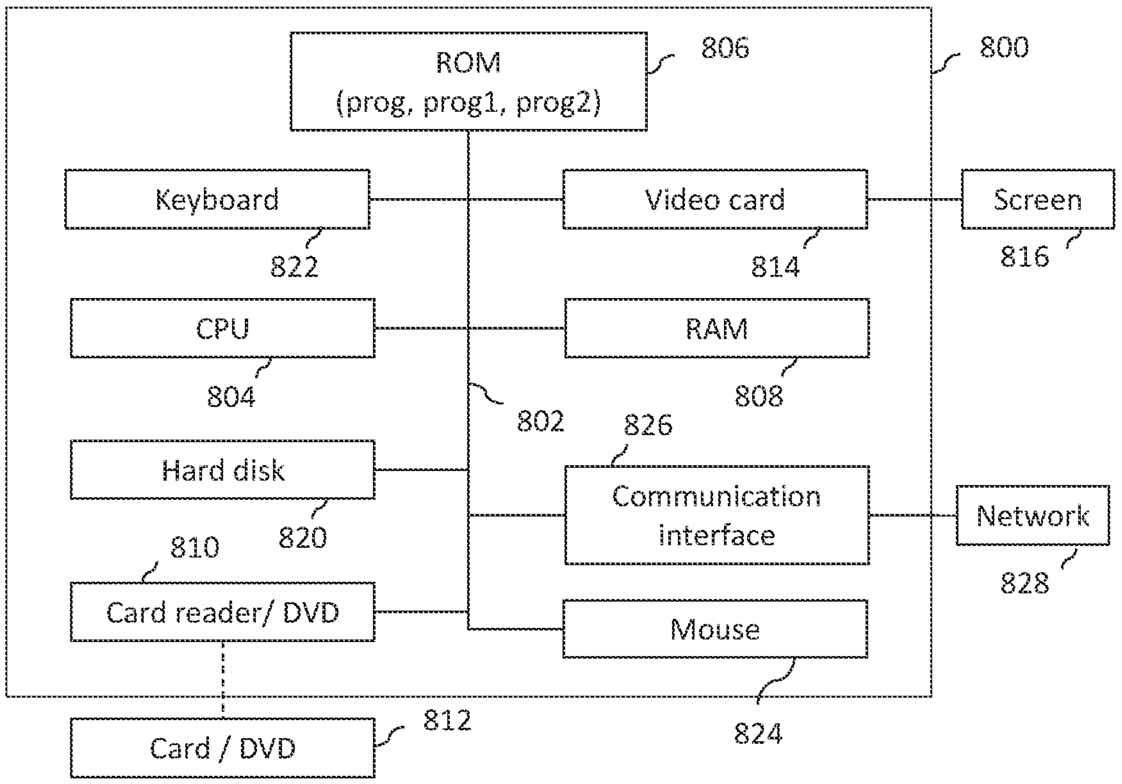
FIG. 8 illustrates an example of a device able to be used to implement, at least partially, embodiments of the invention, in particular steps described with reference to FIGS. 3 to 7.

FIG. 8 illustrates an example of a device able to be used to implement, at least partially, embodiments of the invention, in particular steps described with reference to FIGS. 3 to 7.

The device 800 is for example a server, a computer, a terminal or a personal device such as a smartphone or a tablet.

The device 800 preferably comprises a communication bus 802 to which are connected:

- a central processing unit (CPU) or microprocessor 804;
- a read only memory 806 (ROM) able to include an operating system and programs such as "Prog";
- a random access memory (RAM) or cache memory 808, comprising registers adapted to record variables and parameters created and modified during the execution of the aforementioned programs; and
- a communication interface 826 connected to a distributed communication network 828, for example a wireless communication network and/or a local communication network, the interface being configured to send and receive data, in particular to and from a device of a user.

Optionally, the device 800 may also have the following elements:

- a hard disk 820 able to contain the aforesaid programs "Prog" and data processed or to be processed according to the invention;
- a keyboard 822 and a mouse 824 or any other pointing device such as an optical stylus, a touch screen or a remote control enabling the user to interact with the programs according to the invention; and
- a reader 810 of a removable storage medium 812 such as a memory card or a disc, for example a DVD disc; and
- a graphics card 814 linked to a screen 816.

The communication bus allows communication and interoperability between the different elements included in the device 800 or connected to it. The representation of the bus is non-limiting and, in particular, the central processing unit may communicate instructions to any element of the device 800 directly or by means of another element of the device 800.

The executable code of each program enabling the programmable apparatus to implement the processes according to the invention may be stored, for example, on the hard disk 820 or in read only memory 806.

According to a variant, the executable code of the programs can be received by the intermediary of the communication network 828, via the interface 826, in order to be stored in an identical fashion to that described previously.

More generally, the program or programs may be loaded into one of the storage means of the device 800 before being executed.

The central processing unit 804 will control and direct the execution of the instructions or portions of software code of the program or programs according to the invention, these instructions being stored on the hard disk 820 or in the read-only memory 806 or in the other aforementioned storage elements. On powering up, the program or programs which are stored in a non-volatile memory, for example the hard disk 820 or the read only memory 806, are transferred into the random-access memory 808, which then contains the executable code of the program or programs according to the invention, as well as registers for storing the variables and parameters necessary for implementation of the invention.

According to the embodiment chosen, certain acts, actions, events or functions of each of the methods described in the present document may be carried out or occur in a different order than that in which they have been described, or may be added, merged or not carried out or not occur, according to the case. Furthermore, in some embodiments, certain acts, actions or events are carried out or occur concurrently and not successively.

Although described through a certain number of detailed examples, the method provided and the equipment for the implementation of the method comprise different variants, modifications and improvements which will be obviously apparent to the person skilled in the art, it being understood that these different variants, modifications and improvements form part of the scope of the invention, as defined by the following claims. Furthermore, different aspects and features described above may be implemented together, or separately, or else be substituted for each other, and all the different combinations and sub-combinations of the aspects and features form part of the scope of the invention. Furthermore, it may be that some systems and equipment described above do not incorporate all the modules and functions described for the preferred embodiments.

TABLE 1

| Operator ID | RTP | conversion (R->V) | conversion (R->V) | currency |
|---|---|---|---|---|
| 1234567 | 73 | 250 | 1/250 | pound |
| 4689216 | 85 | 30 | 1/30 | dollar |
| 2527535 | 69 | 325 | 1/320 | yen |
| . . . | . . . | . . . | . . . | . . . |
| 8461214 | 71 | 89 | 1/90 | euro |
| . . . | . . . | . . . | . . . | . . . |

The invention claimed is:

1. A computer method for managing winnings of multiplayer digital games of gambling and of chance, the method comprising receiving, from a terminal of a player, by a server of a gaming operator, an indication of participation in a multiplayer digital game of chance, called first indication, said first indication comprising at least one information item relative to an amount of a first bet;

sending the first indication to a first game engine, the first game engine being configured to implement the multiplayer game, implementing a multiplayer game session and determining, by the first game engine, an amount of winnings for each player of said multiplayer game session, the sum of the amounts of bet of said multiplayer game session being equal to the sum of the determined amounts of winnings;

obtaining, from the first game engine, by the server, an amount of a first winnings corresponding to the participation of said player in said multiplayer game session;

receiving, from the terminal of the player, by the server, an indication of participation in a single-player digital game of chance, called second indication, said second indication comprising at least one information item relative to an amount of a second bet;

sending the second indication, to a second game engine, the second game engine being configured to implement the single-player game, implementing a session of the single-player game and determining, by the second game engine, an amount of a second winnings, the amount of the second winnings being determined with a return to player defined by the gaming operator and being less than one hundred percent; and obtaining, from the second game engine, by the server, the amount of the second winnings.

2. The method according to claim 1, the multiplayer game and the single-player game accepting bets in a virtual currency and providing winnings in said virtual currency, the method further comprising a conversion of the amount of the second winnings into a real currency according to a conversion rate defined by the gaming operator.

3. The method according to claim 2, wherein the conversion is a first conversion and the conversion rate is a first conversion rate, the method further comprising a second conversion of an amount in a real currency into an amount in the virtual currency according to a second conversion defined by the gaming operator, the amount in the virtual currency making it possible to carry out the first bet.

4. The method according to claim 2, wherein the player is a first player, the gaming operator is a first gaming operator, the session of the single-player game is a first session of the single-player game and the return to player defined by the gaming operator is a first return to player defined by the first gaming operator, the method further comprising receiving, from a terminal of a second player, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, an amount of a third winnings corresponding to the participation of the second player in said multiplayer game session;

receiving, from the terminal of the second player, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by a second gaming operator and being less than one hundred percent;

obtaining, from the second game engine, the amount of the fourth winnings.

5. The method according to claim 1, wherein the player is a first player, the gaming operator is a first gaming operator, the server is a first server, the session of the single-player game is a first session of the single-player game and the return to player defined by the gaming operator is a first return to player defined by the first gaming operator, the method further comprising receiving, from a terminal of a second player, by a second server, the second server being a server of a second gaming operator, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, by the second server, an amount of a third winnings corresponding to the participation of the second player in said multiplayer game session;

receiving, from the terminal of the second player, by the second server, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by the second gaming operator and being less than one hundred percent;

obtaining, from the second game engine, by the second server, the amount of the fourth winnings.

6. The method according to claim 4, wherein the first return to player and the second return to player are different.

7. The method according to claim 4, further comprising a conversion of the amount of the fourth winnings into an amount in a currency defined by the second gaming operator according to a conversion rate defined by the second gaming operator.

8. The method according to claim 7, wherein the currency into which is converted the amount of the second winnings is different from the currency into which is converted the amount of the fourth winnings.

9. The method according to claim 4, further comprising a conversion of an amount in a real currency into an amount in the virtual currency according to a conversion rate defined by the first gaming operator to perform the third bet.

10. A non-transitory computer-readable medium on which is stored a computer program comprising instructions for implementing each of the steps of the method according to claim 1, when that program is executed by a processor.

11. A device comprising a processing unit configured for executing each of the steps of the method according to claim 1.

12. The method according to claim 1, wherein the player is a first player, the gaming operator is a first gaming operator, the session of the single-player game is a first session of the single-player game and the return to player defined by the gaming operator is a first return to player defined by the first gaming operator, the method further comprising receiving, from a terminal of a second player, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, an amount of a third winnings corresponding to the participation of the second player in said multiplayer game session;

receiving, from the terminal of the second player, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by a second gaming operator and being less than one hundred percent;

obtaining, from the second game engine, the amount of the fourth winnings.

13. The method according to claim 3, wherein the player is a first player, the gaming operator is a first gaming operator, the session of the single-player game is a first session of the single-player game and the return to player defined by the gaming operator is a first return to player defined by the first gaming operator, the method further comprising receiving, from a terminal of a second player, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, an amount of a third winnings corresponding to the participation of the second player in said multiplayer game session;

receiving, from the terminal of the second player, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by a second gaming operator and being less than one hundred percent;

obtaining, from the second game engine, the amount of the fourth winnings.

14. The method according to claim 2, wherein the player is a first player, the gaming operator is a first gaming operator, the server is a first server, the session of the single-player game is a first session of the single-player game and the return to player defined by the gaming operator is a first return to player defined by the first gaming operator, the method further comprising receiving, from a terminal of a second player, by a second server, the second server being a server of a second gaming operator, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, by the second server, an amount of a third winnings corresponding to the participation of the second player in said multiplayer game session;

receiving, from the terminal of the second player, by the second server, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by the second gaming operator and being less than one hundred percent;

obtaining, from the second game engine, by the second server, the amount of the fourth winnings.

15. The method according to claim 3, wherein the player is a first player, the gaming operator is a first gaming operator, the server is a first server, the session of the single-player game is a first session of the single-player game and the return to player defined by the gaming operator is a first return to player defined by the first gaming operator, the method further comprising receiving, from a terminal of a second player, by a second server, the second server being a server of a second gaming operator, an indication of participation in the multiplayer game, called third indication, said third indication comprising at least one information item relative to an amount of a third bet;

sending the third indication to the first game engine, the first player and the second player both participating in said session of the multiplayer game;

obtaining, from the first game engine, by the second server, an amount of a third winnings corresponding to the participation of the second player in said multiplayer game session;

receiving, from the terminal of the second player, by the second server, an indication of participation in the single-player game, called fourth indication, the fourth indication comprising at least one information item relative to an amount of a fourth bet;

sending the fourth indication to the second game engine, implementing a second session of the single-player game and determining, by the second game engine, an amount of a fourth winnings, the amount of the fourth winnings being determined with a second return to player defined by the second gaming operator and being less than one hundred percent;

obtaining, from the second game engine, by the second server, the amount of the fourth winnings.

16. The method according to claim 5, wherein the first return to player and the second return to player are different.

17. The method according to claim 5, further comprising a conversion of the amount of the fourth winnings into an amount in a currency defined by the second gaming operator according to a conversion rate defined by the second gaming operator.

18. The method according to claim 6, further comprising a conversion of the amount of the fourth winnings into an amount in a currency defined by the second gaming operator according to a conversion rate defined by the second gaming operator.

19. A non-transitory computer-readable medium on which is stored a computer program comprising instructions for implementing each of the steps of the method according to claim 2, when that program is executed by a processor.

20. A non-transitory computer-readable medium on which is stored a computer program comprising instructions for implementing each of the steps of the method according to claim 3, when that program is executed by a processor.

* * * * *